United States Patent [19]

Tung et al.

[11] 3,946,130
[45] Mar. 23, 1976

[54] TRANSPARENT GLASS MICROSPHERES AND PRODUCTS MADE THEREFROM

[75] Inventors: Chi Fang Tung, Mahtomedi Village, Minn.; James A. Laird, St. Joseph Township, St. Croix County, Wis.

[73] Assignee: Minnesota Mining and Manufacturing Company, St. Paul, Minn.

[22] Filed: Apr. 1, 1974

[21] Appl. No.: 456,458

[52] U.S. Cl.................. 428/325; 106/47 R; 106/52
[51] Int. Cl.² .. C03C 3/12; B32B 17/00; C03C 3/30
[58] Field of Search.............. 106/47 R, 52; 428/325

[56] References Cited
UNITED STATES PATENTS

| | | | |
|---|---|---|---|
| 2,790,723 | 4/1957 | Stradley et al. | 106/47 R |
| 2,939,797 | 6/1960 | Rindone | 106/47 R |
| 2,980,547 | 4/1961 | d'Adrian | 106/47 R |
| 3,022,182 | 2/1962 | Cleek et al. | 106/52 |
| 3,041,191 | 6/1962 | d'Adrian | 106/47 R |
| 3,193,401 | 7/1965 | Alexander et al. | 106/52 |
| 3,198,641 | 8/1965 | Searight et al. | 106/47 R |
| 3,294,558 | 12/1966 | Searight et al. | 106/47 R |
| 3,294,559 | 12/1966 | Searight et al. | 106/47 R |
| 3,419,403 | 12/1968 | Searight et al. | 106/47 R |
| 3,468,681 | 9/1969 | Jaupain | 106/47 R |
| 3,563,771 | 2/1971 | Tung | 106/47 R |
| R26,217 | 6/1967 | Rindone | 106/47 R |

*Primary Examiner*—Winston A. Douglas
*Assistant Examiner*—Mark Bell
*Attorney, Agent, or Firm*—Alexander, Sell, Steldt & DeLaHunt

[57] ABSTRACT

Transparent glass microspheres that are based on a ternary system of $TiO_2$, heavy-metal oxide selected from BaO and CdO, and strong glass-forming oxide selected from $SiO_2$, $P_2O_5$, and $GeO_2$ are disclosed. The microspheres have improved uniformity in optical properties and in handling properties, whereby retroreflective products of greater retroreflectivity can be made.

12 Claims, 2 Drawing Figures

TRANSPARENT GLASS MICROSPHERES AND PRODUCTS MADE THEREFROM

BACKGROUND OF THE INVENTION

There is a continuing effort in the retroreflective industry to produce products of greater retroreflectivity. The present invention achieves such an increase in retroreflectivity by discovery of transparent glass microspheres that have improved optical, physical, and chemical properties.

The superiority of the new microspheres can be seen by comparing them with the microspheres used in products that presently achieve industry-setting standards of retroreflectivity. One deficiency in the prior-art microspheres is that under normal storage conditions they tend to clump together, probaby because they absorb moisture. This clumping can reduce the uniformity and density of distribrtion of the microspheres in a retroreflective product, and the result is a limitation on the intensity of retroreflection from the product.

Another fault of the prior-art microspheres is that they lack stability in composition. Thus, the composition of the microspheres, and accordingly their properties, varies with small, difficult-to-avoid changes in processing parameters. One important variation is a variation throughout a batch of the prior-art microspheres as to index of refraction, which determines the retroreflective properties of the microspheres and which is a design parameter for retroreflective products that include them. The larger the diameter of the microspheres in the batch, the lower their index of refraction. It is theorized that this difference an index of refraction occurs during formation of the microspheres, as a result of a tendency for smaller microspheres to lose easily-vaporized low-index ingredients.

Since maximum retroreflectivity is obtained in a retroreflective product when all the microspheres in the product have the same predetermined index of refraction (in order to obtain precise focusing of incident light rays on a reflective surface disposed at the back of the microspheres; for many retroreflective sheeting products, an index of refraction of 1.93 is optimum), the lack of uniformity in index of refraction reduces retroreflectivity.

Other important consequences of instability in composition are wastage, because microspheres are formed that do not satisfy established specifications; and a need for more extensive process controls, which increases manufacturing costs.

In summary, while the prior-art microspheres have provided very useful retroreflective products, improvement is desired and can lead to advances in the retroreflective industry.

SUMMARY OF THE INVENTION

The present invention provides glass microspheres that have improved properties, including a more uniform index of refraction and an increased ability to flow freely so as to be applicable in a uniform manner, which permits retroreflective products of maximum retroreflectivity to be obtained. Briefly, these microspheres consist essentially of between about 20 and 50 weight-percent $TiO_2$, between about 25 and 70 weight-percent of heavy metal oxide selected from BaO and CdO, between 0 and 35 weight-percent of glass-forming oxide selected from $SiO_2$, $P_2O_5$ and $GeO_2$, and up to about 50 weight-percent of constituents listed in FIG. 2 of the drawing within proportions as listed in FIG. 2; and the proportions of the ingredients define points within polygon ABCDEF of FIG. 1 of the drawings. The microspheres are free of alkali oxides, they contain less than 5 weight-percent of scattered crystallinity, and they are at least 95 weight-percent bubble-free. The microspheres are essentially colorless (that is, light transmitted through the glass microspheres is essentially colorless); they are transparent, and they have a uniform index of refraction between 1.85 and 2.0. They are generally less than 2 millimeters in diameter.

Systems based on $TiO_2$, BaO, and $SiO_2$ have been extensively studied in the past (see, for example, U.S. Pat. Nos. 2,838,408; 2,939,797; 2,992,122; 3,022,182; 3,193,401; 3,294,558; and 3,419,403), but insofar as known, no one has previously recognized that microspheres having the superior features and utilities described above could be made from compositions as described. Insofar as known, the prior teachings all indicate that glass microspheres should include one or more ingredients in addition to the three named basic ingredients, for purposes such as to reduce viscosity so as to permit formation of small, bubble-free microspheres; to improve glass-formation so as to form clear non-crystalline vitreous microspheres; to attain a desired index of refraction; or to attain a desired color or freedom from color. We have now found that microspheres that do not include those additional ingredients may be made using conventional procedures known today, and that such microspheres have the significant advantages discussed above.

DETAILED DESCRIPTION

Figures 1, 2:
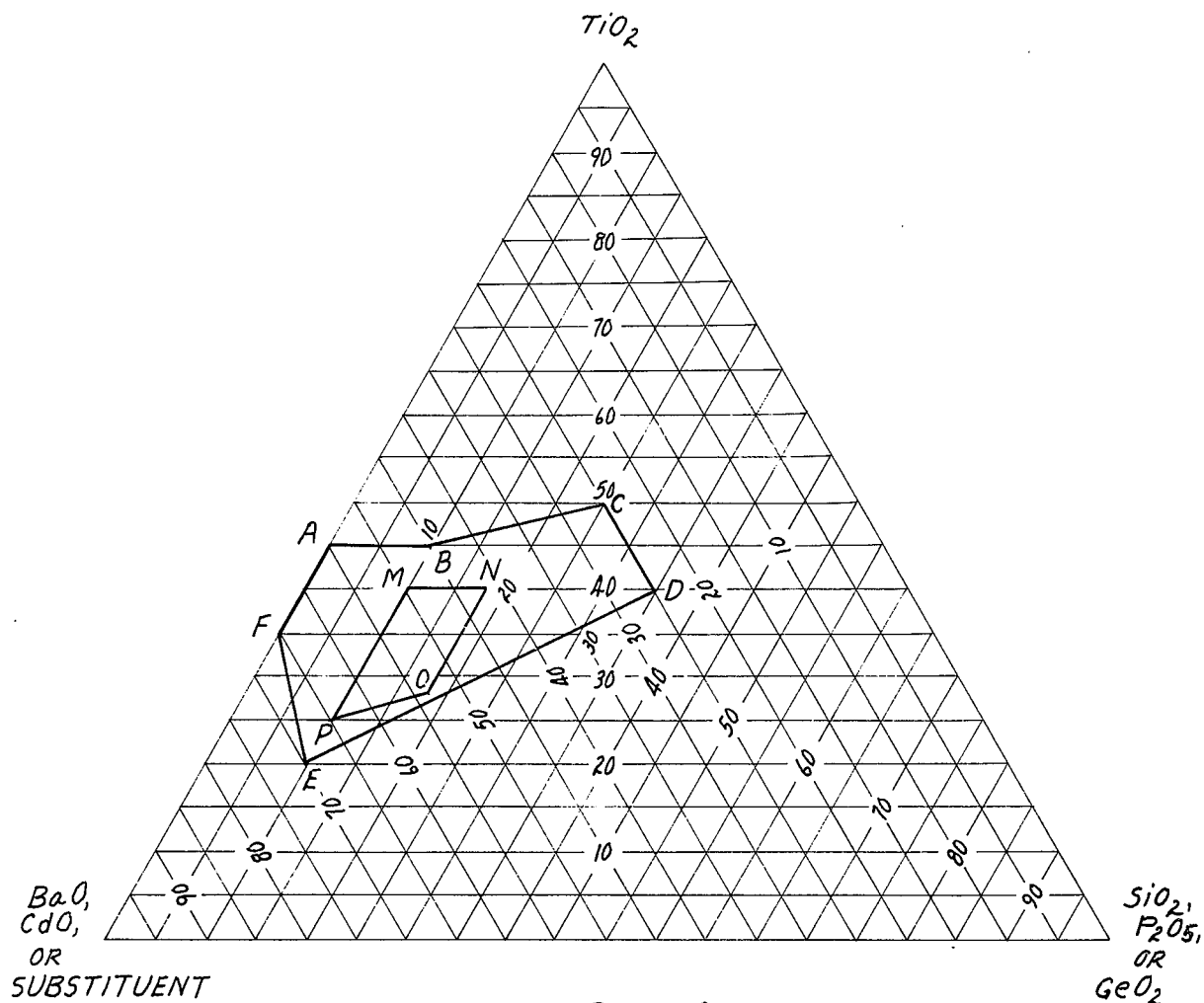
FIG. 1 is a ternary diagram showing the proportions of the basic constituents included in glass microspheres of the invention; the proportion of $TiO_2$ is shown along one axis of the diagram; the total proportion of BaO and/or CdO and of any constituent from FIG. 2 is shown along a second axis of the diagram; and the proportion of $SiO_2$, $P_2O_5$, and/or $GeO_2$ is shown along the third axis of the diagram.
FIG. 2 is a chart showing metal oxides that may be used as substituents for the basic constituents in glass microspheres of the invention; the chart is organized in accord with the position on a periodic chart of the metal elements of the oxides.

Preferred glass microspheres of the invention include $TiO_2$, BaO, and $SiO_2$. $SiO_2$ is not essential, but its ready ability to form glass and its effect of reducing the time for melting of the ingredients makes it strongly preferred. One or two percent will effect some reduction in melting time, but usually at least five percent of $SiO_2$ (or one of its substituents) will be included. BaO can be partially or wholly replaced with CdO, but BaO is preferred because it is less toxic and less expensive. $SiO_2$ can be partially or wholly replaced either with $P_2O_5$, which is less preferred because it is corrosive and violently reacts with barium carbonate, or with $GeO_2$, which offers desired properties but is more expensive than $SiO_2$.

(As is common in the glass art, these constituents are described as oxides, which is the form in which they are presumed to exist in the completed microspheres, and which gives the proportions of chemical elements in the composition. In fact the ingredients added to a preparation mixture may be in the form of some other chemical compound, such as barium carbonate, and the composition becomes modified to the oxide form during melting of the ingredients.)

The broad range for the proportions of ingredients in glass microspheres of the invention is generally outlined in FIG. 1 by the polygon labeled ABCDEF. Compositions that are outside the polygon ABCDEF of FIG. 1 either have indexes of refraction outside the desired range, are difficult to melt or otherwise process into suitable glass microspheres, or have other undesired characteristics. Within the broad range or proportions defined by the polygon ABCDEF lies a more preferred range of proportions, which are defined by the polygon MNOP in FIG. 1. Compositions within the preferred range have a preferred index of refraction (generally between 1.90 and 1.95), have more uniform properties, and are easier to process into suitable glass microspheres.

Another ingredient in preferred microspheres of the invention is ZnO, which assists in melting of the composition from which the microspheres are to be formed. Although ZnO has a higher vapor pressure, so that part of it may volatilize in a melt of the composition, the index of refraction of ZnO (2.0) is so near the index of refraction desired for the microspheres that loss of ZnO during the melting process does not significantly alter the index of refraction of the composition. As little as about one weight-percent of ZnO is beneficial, 5 weight-percent or more is preferred, and generally no more than about 20 weight-percent is included.

Various other ingredients can also be included in glass microspheres of the invention, generally as a substituent for BaO or CdO (although BaO, CdO, or the total of BaO and CdO will still account for at least 25 weight-percent of the composition). The other possible constituents are set out in FIG. 2 of the drawing which, as noted above, is organized in the form of a partial periodic chart (impurities may also be present in minor amounts). The range of proportions for a constituent is given in the lower part of the square for the constituent. The box for didymium oxide ($Di_2O_3$; which is a mixture of oxides including 45.5 weight-percent $La_2O_3$, 11 weight-percent $Pr_6O_{11}$, 38 weight-percent $Nd_2O_3$, 4 weight-percent $Sm_2O_3$, and 0.4 weight-percent $Y_2O_3$, with the remaining 1.1. weight-percent accounted for by rare-earth oxides or impurities) is a part of FIG. 2. Less than about 50 weight-percent, and preferably less than about 20 weight-percent, of constituents from FIG. 2 may be included in microspheres of the invention. Each of these ingredients is preferably not included in microspheres of the invention, for reasons such as an increase in viscosity, an increase in toxicity, an increased tendency to solarize, increased cost, and an increased tendency to volatilize, but one or more may be included to achieve particular result.

To assure absence of color, microspheres of the invention may be subjected to heat treatment under oxidizing conditions to oxidize reduced metals, such as $Ti^{+3}$. Although microspheres of the invention are essentially colorless, the basic composition used in microspheres of the invention can be used in making colored microspheres of useful properties. Ingredients that could be added to provide color include $Cr_2O_3$, generally included in an amount between 0 and 1 weight-percent, $MnO_2$ (0-12 weight-percent), $Fe_2O_3$ (0-12 weight percent), NiO (0-12 weight-percent), $CeO_2$ (0-6 weight percent), $Nd_2O_3$ (0-6 weight-percent), and $V_2O_5$ (0-6 weight-percent).

When phosphorous is substituted for silicon in whole or in part, the batch should be intimately mixed, as by wet ballmilling, and the phosphorous should be present in the form of a high melting compound, such as barium phosphate. Barium phosphate may be made by reacting phosphoric acid with barium carbonate at room temperature to form barium phosphate, which in turn will react with titania at 1400°C to form a liquid that can be quenched as a glass. By contrast, if ammonium phosphate were used as the source of phosphorous, the ammonium phosphate might decompose upon heating to liberate $P_2O_5$ as a gas which would escape from the batch. A barium titanate composition would be left that might not form a suitable glass. If the titania is not thoroughly dispersed in the barium phosphate, the titania remains unmelted at 1400°C and the glass is not homogeneous nor of the proper refractive index.

Microspheres of the invention can be prepared by conventional processes. In one useful process the ingredients are measured out in particulate form — preferably between about 0.01 and 50 micrometers in size — and intimately mixed together. They are then melted in a gas-fired or electrical furnace until all the ingredients are in liquid form. The liquid is then quenched in water, dried, and crushed to a small particle size, which is the desired size for the final microspheres. The particles may be screened to assure that they are in the proper range of sizes. The crushed particles are then passed through a flame having a temperature generally between about 1100°C and 1450°C to spheroidize the particles.

Alternatively, once the batch has been heated to the point where all ingredients are liquid, the liquid batch can be poured into a jet of high velocity air which thereby forms glass microspheres of the desired size. The velocity of the air is adjusted in this method to cause the microspheres formed to have the right dimensions.

Microspheres of the invention have excellent optical properties; for example, they contain no more than 5 weight-percent scattered crystallinity (that is, no more than 5 weight-percent of the microspheres would be rejected as opaque because of crystallinity) and they are at least 95 weight-percent bubblefree. As previously noted, they have a uniform index refraction generally between 1.85 and 2.0 and for preferred retroreflective sheeting between 1.90 and 1.95.

Microspheres of various sizes can be made. It is difficult to deliberately form microspheres smaller than 10 micrometers in diameter, though a fraction of microspheres down to 2 or 3 micrometers in diameter is sometimes formed as a by-product of manufacturing larger microspheres. Generally the uses for glass microspheres call for the microspheres to be less than 2 millimeters in diameter, and most often less than 1 millimeter in diameter. Microspheres to be used in retroreflective sheeting are generally between about 30 and 150 micrometers in diameter.

Microspheres of the invention can be used in a variety of retroreflective products — sheeting, coating materials, pavement-marking compositions, etc. Retroreflective sheeting is conveniently formed using glass microspheres of the invention by methods that are known in the art; see U.S. Pat. Nos. 2,407,680 and 3,190,178. Microspheres of the invention may also be used in coating materials such as described in U.S. Pat Nos. 2,963,378 and 3,228,897.

When incorporated into retroreflective sheeting, products of high retroreflectivity are consistently obtained. The good retroreflectivity can be illustrated by the following test. A suitable binder material is coated onto a black non-reflective flat surface, after which glass microspheres that are between 30 and 150 micrometers in diameter and that are completely coated with silver are cascaded onto the layer of binder material. A densely packed monolayer is formed, with the microspheres embedded to about one-half their diameter. The monolayer of microspheres is then etched with acid to remove the silver coating from the exposed portions of the microspheres.

The reflective intensity of the sample is then measured with a photometer (giving a reading indicated by the abbreviation "PV"), which is positioned so that the divergence angle (the angle subtended between straight lines connecting the light source to the reflective area and then connecting the reflective area to the photometer) is one-third of a degree. The reflection intensity is measured at a 5° angle of incidence (the angle of incidence is the angle subtended between a straight line connecting the light source to the reflective area and a line perpendicular to the plane of the reflective area). The photometer used is obtained from the Photovolt Corporation, New York (Model 20). In this test, a monolayer of glass microspheres of the invention consistently provides a photometer reading of at least 105 PV.

The invention will be further illustrated with the following examples:

EXAMPLES 1 – 31

Particles of titania, barium carbonate, and silica having an average diameter of about 5 micrometers were measured out in various proportions (as shown in Table I) to form 70- gram batches. These raw materials were mixed by hand in a mortar and pestle, and the batch was packed into a "Coors" Brand, size 03 crucible. The crucible and its contents were then preheated for 2 minutes at 800°C and then melted at 1400°C. Thereupon the molten liquid was poured into a hot jet of air having a gauge pressure of 28 kilograms/square centimeters.

Glass microspheres were formed having an index of refraction as shown in Table I. The time for melting of the ingredients at 1400°C is also given in Table I.

TABLE I

| Example No. | Constituents (weight-percent) | | | Time for Melting at 1400°C (minutes) | Index of Refraction |
|---|---|---|---|---|---|
| | TiO$_2$ | BaO | SiO$_2$ | | |
| 1 | 42 | 38 | 20 | 8:25 | 1.91 |
| 2 | 33.1 | 56.9 | 10 | 9:30 | 1.925 |
| 3 | 28 | 52 | 20 | 9:05 | 1.87 |
| 4 | 38 | 47 | 15 | 8:05 | 1.95 |
| 5 | 36.5 | 45.5 | 18 | 7:40 | 1.93 |
| 6 | 39.5 | 35.5 | 25 | 10:10 | 1.90 |
| 7 | 34 | 51 | 15 | 8:20 | 1.925 |
| 8 | 33.6 | 50.4 | 16 | 9:20 | 1.91 |
| 9 | 37 | 33 | 30 | 6:50 | 1.85 |
| 10 | 32 | 43 | 25 | 7:10 | 1.85 |
| 11 | 26 | 54 | 20 | 8 | 1.85 |
| 12 | 23 | 67 | 10 | 11:10 | 1.85 |
| 13 | 42 | 38 | 20 | 8:25 | 1.91 |
| 14 | 38 | 47 | 15 | 7:10 | 1.93 |
| 15 | 36.5 | 53.5 | 10 | 7:20 | 1.935 |
| 16 | 36.5 | 58.5 | 5 | 7:40 | 1.935 |
| 17 | 40 | 60 | — | 12:20 | 1.965 |
| 18 | 30.8 | 59.2 | 10 | 8:10 | 1.90 |
| 19 | 30 | 65 | 5 | 10:05 | 1.89 |
| 20 | 30.8 | 59.2 | 10 | 7:05 | 1.91 |
| 21 | 32.4 | 55.2 | 12.5 | 6:15 | 1.91 |
| 22 | 36.5 | 45.5 | 18 | 6:10 | 1.93 |
| 23 | 34 | 51 | 15 | 7:05 | 1.92 |
| 24 | 33.1 | 51.9 | 15 | 8:15 | 1.89 |
| 25 | 46 | 32 | 22 | 12 | 1.95 |
| 26 | 45 | 40 | 15 | 8 | 1.96 |
| 27 | 35 | 45 | 20 | 7 | 1.91 |
| 28 | 33.3 | 42.9 | 23.8 | 8:30 | 1.86 |
| 29 | 42.9 | 38.1 | 19 | 12 | 1.95 |
| 30 | 40.9 | 36.4 | 22.7 | 14 | 1.92 |
| 31 | 47.65 | 33.12 | 19.23 | 14.25 | 1.945 |

EXAMPLES 32 – 77

This set of examples used constant amounts of TiO$_2$ and SiO$_2$, but various ingredients were substituted for BaO. The method of preparation was as described in Examples 1 – 31. The index of refraction of the microspheres that were prepared and the time for melting of the compositions at 1400°C are given in the following tables. In Examples 32 – 43, reported in Table II, the substituent for BaO was ZnO. In Examples 44 – 52, reported in Table III, oxides of various metals having a valence of two were substituted for BaO. In Examples 53 – 68, reported in Table IV, oxides of various metals having a valence of three were substituted for BaO. And in Examples 69 – 77, reported in Table V, a variety of oxides replaced BaO. In Examples 32 to 39 and 44 to 77, the proportions of TiO$_2$ and SiO$_2$ were 33.1 and 15, while in Examples 40 to 43 there was a small variation in these constituents.

TABLE II

| Example No. | Constituents (weight-percent) | | | | Time for melting at 1400°C (minutes) | Index of Refraction |
|---|---|---|---|---|---|---|
| | TiO$_2$ | BaO | SiO$_2$ | ZnO | | |
| 32 | 33.1 | 51.9 | 15 | — | 8:15 | 1.89 |
| 33 | 33.1 | 48.9 | 15 | 3 | 6 | 1.92 |
| 34 | 33.1 | 45.9 | 15 | 6 | 5:25 | 1.925 |
| 35 | 33.1 | 42.9 | 15 | 9 | 5:20 | 1.93 |
| 36 | 33.1 | 39.9 | 15 | 12 | 5:35 | 1.93 |
| 37 | 33.1 | 36.9 | 15 | 15 | 5:30 | 1.93 |
| 38 | 33.1 | 33.9 | 15 | 18 | 5:45 | 1.93 |
| 39 | 33.1 | 30.9 | 15 | 21 | 5:15 | 1.93 |
| 40 | 31.9 | 52.6 | 12.5 | 3 | 6:15 | 1.925 |
| 41 | 31.9 | 50.1 | 12.5 | 5.5 | 5:45 | 1.93 |
| 42 | 29.15 | 49.35 | 12.5 | 9 | 5:35 | 1.91 |
| 43 | 29.15 | 46.35 | 12.5 | 12 | 5:15 | 1.91 |

TABLE III

| Example No. | Constituents (weight-percent) | | | | Time for Melting at 1400°C (minutes) | Index of Refraction |
|---|---|---|---|---|---|---|
| | BaO | CdO | MgO | SrO | | |
| 44 | 48.9 | 3 | — | — | 7:45 | 1.92 |
| 45 | 45.9 | 6 | — | — | 7:05 | 1.925 |
| 46 | 39.9 | 12 | — | — | 6:10 | 1.94 |
| 47 | 27.9 | 24 | — | — | 5:05 | 1.955 |
| 48 | — | 51.9 | — | — | 6:45 | 1.965 |
| 49 | 48.9 | — | 3 | — | 6:35 | 1.91 |
| 50 | 48.9 | — | — | 3 | 7:55 | 1.91 |
| 51 | 45.9 | — | — | 6 | 8:10 | 1.91 |
| 52 | 39.9 | — | — | 12 | 9:30 | 1.905 |

TABLE IV

| Example No. | Constituents (weight-percent) | | | | | | | Time for melting at 1400°C (minutes) | Index of Refraction |
|---|---|---|---|---|---|---|---|---|---|
| | BaO | La₂O₃ | Bi₂O₃ | Di₂O₃ | Al₂O₃ | Y₂O₃ | Sb₂O₃ | | |
| 53 | 48.9 | 3 | — | — | — | — | — | 7:35 | 1.915 |
| 54 | 45.9 | 6 | — | — | — | — | — | 7:40 | 1.925 |
| 55 | 39.9 | 12 | — | — | — | — | — | 7:25 | 1.935 |
| 56 | 27.9 | 24 | — | — | — | — | — | 7:50 | 1.955 |
| 57 | 48.9 | — | 3 | — | — | — | — | 7:05 | 1.93 |
| 58 | 45.9 | — | 6 | — | — | — | — | 6:40 | 1.94 |
| 59 | 39.9 | — | 12 | — | — | — | — | 5:50 | 1.96 |
| 60 | 48.9 | — | — | 3 | — | — | — | 8 | 1.92 |
| 61 | 45.9 | — | — | 6 | — | — | — | 7:20 | 1.925 |
| 62 | 48.9 | — | — | — | 3 | — | — | 7:10 | 1.895 |
| 63 | 45.9 | — | — | — | 6 | — | — | 7:25 | 1.89 |
| 64 | 39.9 | — | — | — | 12 | — | — | 8:25 | 1.89 |
| 65 | 45.9 | — | — | — | — | 6 | — | 8 | 1.925 |
| 66 | 45.9 | — | — | — | — | — | 6 | 6:10 | 1.94 |
| 67 | 39.9 | — | — | — | — | — | 12 | 5:50 | 1.95 |
| 68 | 27.9 | — | — | — | — | — | 24 | 5:50 | 2.00 |

TABLE V

| Example No. | Constituents (weight-percent) | | | | | | | Time for melting at 1400°C (minutes) | Index of Refraction |
|---|---|---|---|---|---|---|---|---|---|
| | BaO | Ta₂O₃ | Nb₂O₃ | ZrO₂ | SnO₂ | WO₃ | MoO₃ | | |
| 69 | 48.9 | 3 | — | — | — | — | — | 7:05 | 1.925 |
| 70 | 45.9 | 6 | — | — | — | — | — | 7:05 | 1.93 |
| 71 | 39.9 | 12 | — | — | — | — | — | 6:15 | 1.95 |
| 72 | 45.9 | — | 6 | — | — | — | — | 6:20 | 1.955 |
| 73 | 39.9 | — | 12 | — | — | — | — | 7:15 | 1.98 |
| 74 | 45.9 | — | — | 6 | — | — | — | 8:05 | 1.93 |
| 75 | 45.9 | — | — | — | 6 | — | — | 7:50 | 1.93 |
| 76 | 48.9 | — | — | — | — | 3 | — | 7:10 | 1.925 |
| 77 | 45.9 | — | — | — | — | — | 6 | 7:40 | 1.935 |

EXAMPLES 78 – 91

Titania, barium carbonate, phosphoric acid, and in some examples zinc oxide were mixed together in 70-gram batches and prepared into microspheres in the way described for Examples 1 – 31. The microspheres prepared had characteristics as shown in Table VI.

TABLE VI

| Example No. | Constituents (weight-percent) | | | | Time for melting at 1400°C (minutes) | Index of Refraction |
|---|---|---|---|---|---|---|
| | TiO₂ | BaO | P₂O₅ | ZnO | | |
| 78 | 28 | 57.7 | 11.8 | 2.5 | 9 | 1.89 |
| 79 | 22.4 | 61.4 | 14.2 | 2 | 7:40 | 1.84 |
| 80 | 42 | 48.4 | 5.9 | 3.7 | 9:40 | 2.04 |
| 81 | 33.6 | 53.9 | 9.5 | 3 | 9 | 1.95 |
| 82 | 32 | 55.6 | 9.5 | 2.9 | 8:25 | 1.935 |
| 83 | 31.25 | 51.91 | 13.94 | 2.8 | 8:25 | 1.91 |
| 84 | 30.75 | 52.24 | 14.26 | 2.75 | 7:40 | 1.905 |
| 85 | 31 | 56 | 13 | — | 11:10 | 1.91 |
| 86 | 15.1 | 58 | 26.9 | — | 6:30 | 1.7 |
| 87 | 33.1 | 51.9 | 15 | — | 7:10 | 1.91 |
| 88 | 20 | 65 | 15 | — | 7:40 | 1.81 |
| 89 | 30 | 55 | 15 | — | 9 | 1.89 |
| 90 | 27 | 53 | 20 | — | 7 | 1.81 |
| 91 | 35 | 50 | 15 | — | 9 | 1.91 |

Example 92
An 80-gram batch was weighed as follows:
TiO₂      23.1 grams
BaCO₃    46.5 grams
GeO₂     10.4 grams Glass microspheres were prepared in the manner described in Examples 1–31. The melt time at 1400°C was found to be 6:55 minutes and the refractive index of the resulting glass microspheres was 1.955.

What is claimed is:
1. Essentially colorless transparent glass microspheres that are less than about 2 millimeters in diameter, have an index of refraction between 1.85 and 2.0, contain less than 5 weight-percent of scattered crystal- linity, and are at least 95 weight-percent bubble-free, said microspheres being free of alkali oxides, having a uniform index of refraction throughout a sample, and being free-flowing so as to be applicable in a uniform manner, whereby retroreflective products of maximum retroreflectivity are obtained, and said microspheres consisting essentially of between about 20 and 50 weight-percent $TiO_2$, between about 2.5 and 70 weight-percent of heavy metal oxide selected from BaO and CdO, up to about 35 weight-percent of glass-forming oxide selected from $SiO_2$, $P_2O_5$ and $GeO_2$, and up to about 50 weight-percent of substituents from the table and within the proportions of FIG. 2 of the drawings; the proportions of the constituents in the microspheres defining points within the polygon ABCDEF of FIG. 1 of the drawings.

2. Microspheres of claim 1 that include between about 1 and 20 weight-percent of ZnO.

3. Microspheres of claim 1 in which the proportions of the constituents in the microspheres define points within the polygon labeled MNOP in FIG. 1 of the drawings.

4. Microspheres of claim 3 that further include between about 1 and 20 weight-percent of ZnO.

5. Retroreflective sheeting comprising a support sheet and a uniform densely packed monolayer of transparent glass microspheres of claim 1 carried on the support sheet, said microspheres having a diameter between about 30 and 150 micrometers and having an index of refraction between 1.90 and 1.95 that is uniform throughout the monolayer.

6. Retroreflective sheeting of claim 5 in which the transparent glass microspheres further include between about 1 and 20 weight-percent of ZnO.

7. Retroreflective sheeting of claim 5 in which the proportions of the constituents in the microspheres define points within the polygon labeled MNOP in FIG. 1 of the drawings.

8. Retroreflective sheeting of claim 7 in which the microspheres further include between about 1 and 20 weight-percent of ZnO.

9. Essentially colorless transparent glass microspheres that are less than about 2 millimeters in diameter, have an index of refraction between 1.90 and 1.95, contain less than 5 weight-percent of scattered crystallinity, and are at least 95 weight-percent bubble-free, said microspheres being free of alkali oxides, having a uniform index of refraction throughout a sample, and being free-flowing so as to be applicable in a uniform manner, whereby retroreflective products of maximum retroreflectivity are obtained, and said microspheres consisting essentially of between about 25 and 40 weight-percent $TiO_2$, between about 42 and 65 weight-percent of heavy metal oxide selected from BaO and CdO, between about 10 and 18 weight-percent of glass-forming oxide selected from $SiO_2$, $P_2O_5$ and $GeO_2$, and up to about 20 weight-percent of substituents from the table and within the proportions of FIG. 2 of the drawings; the proportions of the constituents in the microspheres defining points within the polygon MNOP of FIG. 1 of the drawings.

10. Microspheres of claim 9 that include between about 1 and 20 weight-percent of ZnO.

11. Microspheres of claim 10 that consist essentially of $TiO_2$, BaO, $SiO_2$, and ZnO.

12. Retroreflective sheeting comprising a support sheet and a uniform densely packed monolayer of transparent glass microspheres of claim 11 carried on the support sheet, said microspheres having a diameter between about 30 and 150 micrometers.

* * * * *

UNITED STATES PATENT AND TRADEMARK OFFICE
CERTIFICATE OF CORRECTION

PATENT NO. : 3,946,130
DATED : March 23, 1976
INVENTOR(S) : Chi Fang Tung and James A. Laird It is certified that error appears in the above–identified patent and that said Letters Patent are hereby corrected as shown below:

In column 9, line 8, "2.5" should be --25--.

Signed and Sealed this first Day of June 1976

[SEAL]

Attest:

RUTH C. MASON
Attesting Officer

C. MARSHALL DANN
Commissioner of Patents and Trademarks